July 30, 1963     H. DE HART ET AL     3,099,493

SUPPORTS FOR AERATING PARTICULATE MATERIALS

Filed Feb. 2, 1961

INVENTORS
Donald Herbert Brooks
Harold DeHart
BY
Karl Hulse
James E. Bryan
ATTORNEYS 3,099,493
SUPPORTS FOR AERATING PARTICULATE
MATERIALS
Harold De Hart, Clifton, N.J., and Donald Herbert
Brooks, Northdene, Transvaal, Republic of South
Africa, assignors to Indevco Ltd., Mauren, Liechtenstein, a corporation of Canada
Filed Feb. 2, 1961, Ser. No. 86,657
2 Claims. (Cl. 302—29)

The present invention relates to improved supports for the aeration of particulate materials, e.g. powders.

Supports for the aeration of particulate materials are required in a variety of apparati for fluidising or aerating powders, e.g. in the apparatus used in the coating of surfaces by means of aerated thermoplastic powders. A further example in which aerating supports are required is the transportation of materials such as powder and ash in a fluidised state where use is generally made of gas-pervious chutes, inclined at an angle, say of approxiately 20°, air or some other suitable aerating medium being continuously blown through the floor of said chutes, thus causing the material in the chutes to become fluidised and flow down the incline under gravity.

Supports known to date are made of sintered materials, e.g. metals, ceramics, filter cloths, etc. Sintered support plates are very expensive, while filter cloths are unsuitable for certain applications involving the use of high temperatures. In some cases the lack of rigidity of filter cloth is a further disadvantage.

It is an object of the invention to provide a support for the aeration of particulate materials suitable for a wide variety of applications, which, depending on requirements, can be made to overcome or mitigate some or all of the above-mentioned disadvantages of conventional supports.

In particular it is an object of the invention to provide a support with which a very even aeration can be attained, a factor of great importance when working with "static aerates"; a specific state of aeration intermediate between that of true fluidisation and loosely settled particles, involving low velocities of aerating medium.

It is a specific object of the invention to provide a satisfactory bed support for various types of coating apparatus employing aerated particulate coating materials and to provide improved coating apparatus incorporating such supports.

The supports in accordance with the present invention have the advantage that they can be designed specifically for the aeration of heavy particulate materials, which cannot normally be effectively and uniformly aerated through a fabric.

It is also an object of the invention to provide a new or improved aerating method.

Further objects, advantages and applications of the invention will become apparent from the following:

The method in accordance with the invention of aerating a particulate material comprises supporting the said particulate material on a surface and causing a finely divided upwardly directed gas stream to pass through said particulate material from isolated clearly defined orifices so spaced that individual gas streams from the said orifices will merge above the plate in the form of a substantially uniform gas stream finely subdivided by the solid particles, before reaching the upper surface of the bed of particulate material over the whole cross-section of the bed which is to be aerated, the total area of said orifices being small in comparison with the total area of said surface underlying the bed of particulate material to be aerated. In the preferred process a plurality of such orifices are evenly distributed over the said surface.

Preferably the individual gas streams passing through the said orifices are each passed through a constriction of small total cross-sectional area compared with the cross-sectional area of the particular orifice, shortly before passing through the said orifice, said constriction being normally provided a short distance below the said orifice.

The process may be carried out in such a manner that each individual said orifice is large in comparison with the average grain size of the particulate material, but that, on the other hand, the above-mentioned constriction underneath the orifice is chosen such that substantially no particulate material can pass therethrough.

According to one form of the process the total gas stream is so regulated as to result in a static aerate, i.e. a state of aeration intermediate between that of the loosely settled powder and a fluidised bed, the aeration being sufficient to produce a high mobility of the particulate material when mechanically disturbed, but insufficient to produce any substantial amount of relative movement between individual particles. This state of aeration differs fundamentally from the fluidised bed state of aeration in which the particles carry out a whirling motion. For producing the static aerate a particulate material is preferably chosen, the individual particles of which are substantially free of interlocking projections and irregularities and which are preferably substantially spherical in shape.

The process is preferably carried out with an aerating support in accordance with the invention for aerating a particulate material which comprises a plate of any suitable shape and profile transgressed by suitably spaced passages, each passage terminating in an orifice of clearly defined outline on one surface of the said plate and comprising a constriction some comparatively short distance below the said orifice, the sum total cross-sectional area of the constriction being small in comparison with the cross-sectional area of the said orifice and the sum total of the cross-sectional areas of the said orifices being comparatively small in comparison with the cross-sectional area of the said plate.

The term "of any suitable shape and profile" means that, although the said plate is usually flat and plane, it may, for example, also be funnel-shaped, trough-shaped, basin-shaped or channel-shaped, depending on the manner of the intended application of the bed support.

The axes of the said passages are preferably normal to the surface bearing the said orifices.

The depth of the said constrictions below the said surface is preferably of the same order as the average diameter of the corresponding orifices. The average spacing of the said orifices on the other hand is preferably large in comparison with the average diameter of the orifices.

The orifices are preferably of circular shape. In the preferred embodiment the portion of the passage immediately preceding the orifice is substantially straight-walled, preferably smooth-walled, e.g. in the form of a cylindrical bore. The straight-walled portion may downwardly lead into a converging portion, e.g. a conical portion, leading to the most constricted part of the said passage.

The constriction may take the form of a single hole or perforation of small diameter in comparison with the diameter of the orifice at the top surface of the plate. Alternatively, the constriction may be composed of a plurality of narrow gas passages the total cross-sectional area of which is also small in comparison with that of the orifice at the top of the plate.

The constriction may also be presented by a portion of porous material. The diameter of the orifices at the top surface of the plate may, for example, be of the order of 1 to 3 mm., say approximately 2 mm.

The spacing of the passages depends on the particular requirements and may for example be between 1 to 2 cm. say approximately 15 mm. However, this depends very largely on the degree of aeration which it is desired to attain with a particular support. The dimensions of the orifices depend very largely on the particle size of the material which is to be aerated. Normally the diameter of each orifice is large in comparison with the diameter of the particles. As a rule the passages will be regularly spaced but in particular cases this may not necessarily be so. Also in this specification a plurality of passages is normally presumed although a powder bed of small-cross-sectional area may conceivably be aerated in accordance with the principles of the present invention by means of a bed support comprising a single passage as specified above.

The said plate is preferably rigid, e.g. to the extent of forming a self-supporting unit. It may, however, also comprise any suitable supporting structure, e.g. cross-beams or the like, preferably provided on the underside of the said plate.

The plate may constitute an integral structure, e.g. in the form of a single solid sheet or disc transgressed by the said passages, which may, for example, have been produced by a complex drilling operation. An alternative embodiment comprises, in a laminated relationship to one another, at least one relatively rigid supporting member, comprising a suitable number of apertures spaced evenly and relatively widely, and further comprises a constricting member flush against and rigidly affixed to the rigid supporting member and provided with passages passing through the constricting member and leading into the apertures of the supporting member the total cross-sectional area of the passages being small in comparison with the apertures in the supporting member with which they communicate.

The said constricting member may take the form of a thin sheet or foil, e.g. of aluminium or other suitable metal. The passages through the constricting member are preferably of the size of pinholes. Normally a single pinhole is provided for each aperture in the rigid supporting member.

Alternatively a fabric of suitable mesh size is used as the constricting member.

The rigid supporting member is normally considerably thicker than the foil or thin sheet serving as the constricting member and may be constructed of any suitable material, e.g. aluminium.

According to one embodiment of the invention the constricting member is affixed to the underside of a single supporting member, e.g. by glueing with a suitable adhesive, e.g. an epoxy resin, soldering or any other suitable method.

In a further embodiment of the support in accordance with the invention a constricting member, e.g. a pinholed foil or thin sheet or a fabric of suitable mesh size, is sandwiched between two rigid supporting members of the type hereinbefore described comprising corresponding apertures in alignment with one another, the laminated assembly being, for example, rivetted, stapled or bolted together, preferably without any adhesive.

The laminated type of support can be manufactured very easily and without high precision machinery.

In accordance with the invention the last-mentioned supports may be produced by affixing, e.g. glueing, a metal or the like foil or thin sheet flush against the underside of a rigid supporting member previously provided with apertures as specified above and subsequently pricking pinholes or the like into the foil or thin sheet in positions corresponding to the apertures in the supporting member.

Alternatively the supports may be produced in accordance with the invention by affixing a fabric or the like of suitable mesh size flush against the underside of a rigid supporting member of the type described.

The supports may furthermore be produced in accordance with the invention by sandwiching a metal or the like foil or thin sheet between two rigid supporting members as specified above, the foil or thin sheet and the two supporting members being rigidly bolted, rivetted or stapled together and subsequently pricking pinholes or the like into the foil or thin sheet in positions corresponding to the aligned apertures in the supporting members.

Alternatively a fabric of suitable mesh size may be firmly sandwiched between the two rigid perforated supporting members in the manner described above. The fabric used in conjunction with either one or two support plates preferably has a mesh size somewhat larger than the preferred mesh size needed if the fabric were to be used by itself as the support and the whole surface were available for admitting the aerating medium to the powder or the like.

The scope of the invention also includes aerating vessels of the type comprising a laterally confined aerating space proper for holding a bed of particulate material to be aerated, a bed support as specified above forming the bottom of the said aerating space proper and a gas box of which the top is formed by the said bed support and which comprises an inlet for introducing gas, e.g. compressed air, under pressure to the said gas box.

The said aerating vessel may be used as a coating apparatus or as part thereof, in particular for use in coating methods employing thermoplastic powder. Thus, the aerating vessel may form the supply vessel for a spray coating apparatus of the type employing aerated powders.

Alternatively the apparatus is intended for the type of process in which a surface to be coated is directly contacted with an aerated bed of particulate coating material while conditions are maintained favouring the adherence of the particles to the surface being coated. The invention is applicable with particular success to a coating apparatus of the last-mentioned class, which comprises an aerating vessel as specified above, the volume of the aerating space being variable for the purpose of displacing a volume of aerated particulate coating material into contact with a surface to be coated.

More particularly the coating apparatus comprises a plunger movable in said aerating vessel to displace a volume of aerated particulate coating material and a passage through which coating material may be displaced upwards into contact with a surface to be coated. In the preferred embodiment the top of the aerating vessel is movable up and down in piston-like manner inside the aerating vessel and comprises a hollow, upwardly directed shaft through which coating material may be displaced. Preferably the said top of the aerating vessel has the shape of an inverted funnel. This last-mentioned type of apparatus is particularly suitable for the internal coating of pipes and other hollow bodies.

The invention and the manner in which it may be put into practice will be further described with reference to the accompanying drawings without thereby limiting the scope of the invention.

Figure 1:
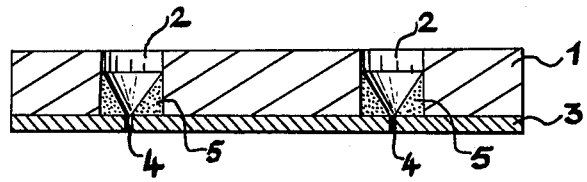
FIG. 1 illustrates a cross-sectional view of a support plate in accordance with the invention which comprises a foil or thin sheet affixed to the underside of a rigid supporting member.

Referring to FIG. 1, plate 1 with apertures 2 is bonded to a foil or thin sheet 3, which is provided with apertures 4, e.g. pinholes. A powder being aerated takes up a funnel-like shape 5 in the apertures 2 around the pinholes or the like 4.

Figure 2:
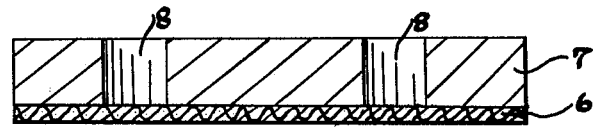
FIG. 2 illustrates a cross-sectional view of a further embodiment of the support plate in which a fabric is affixed to the underside of a rigid supporting member.

In FIG. 2 a fabric 6 of suitable mesh size is glued to the underside of supporting plate 7 said plate 7 having apertures 8.

Figure 3:
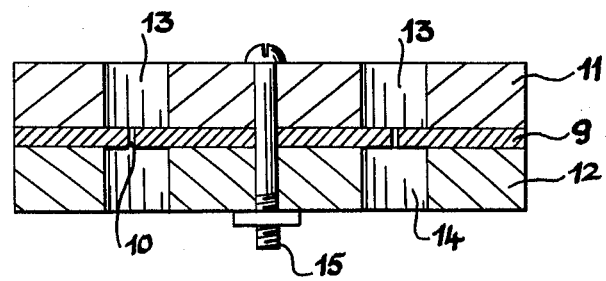
FIG. 3 illustrates a cross-sectional view of another support plate in which a foil or thin sheet is sandwiched between two rigid supporting members.

The foil or thin sheet 9 with small apertures 10 in FIG. 3, is sandwiched between two rigid supporting plates 11 and 12 having substantially larger apertures 13 and 14 respectively, the plates 11 and 12 and the foil or thin sheet 9 being held together by means of bolts or rivets 15. Also in this case the powder being aerated falls, within the apertures of the rigid supporting member 11, into a funnel-like shape around the pinholes 10.

Figure 4:
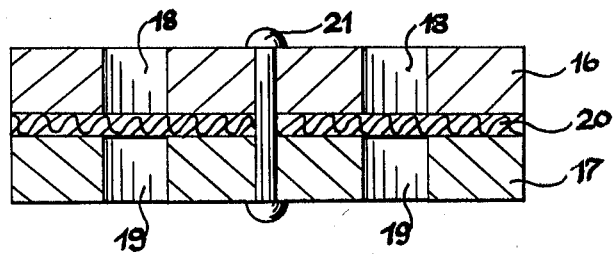
FIG. 4 illustrates a cross-sectional view of the support plate in accordance with the invention which comprises a fabric of suitable mesh sandwiched between two rigid supporting members.

In FIG. 4 two rigid supporting plates 16 and 17 with apertures 18 and 19 respectively sandwich between them a fabric 20 of suitable mesh, the fabric 20 and the plates 16 and 17 being held together by means of bolts or rivets or the like 21.

In all of the above cases the foil or thin sheet or the fabric serves as the constricting member and the total cross-sectional area of any narrow passage or passages (e.g. the said pinholes or the pores of the fabric) is/are substantially smaller than the cross-sectional area of the particular apertures through the supporting plate with which it/they communicate(s).

Figure 5:
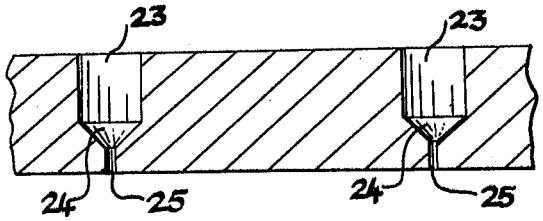
FIG. 5 illustrates a cross-sectional view of a support plate in accordance with the invention made in one piece.

Referring to FIG. 5, of a single plate 22, e.g. of aluminum, holes 23, say having a diameter of 2–3 mm. has been drilled approximately half way through the plate from the upper surface, say 2–3 mm. deep. The holes are, for example, spaced 1 to 2 cm. apart, centre to centre. The holes 23 converge by means of a conical, countersunk portion 24 towards a narrow passage 25 having a very much smaller diameter than the portion 23.

Figure 6:
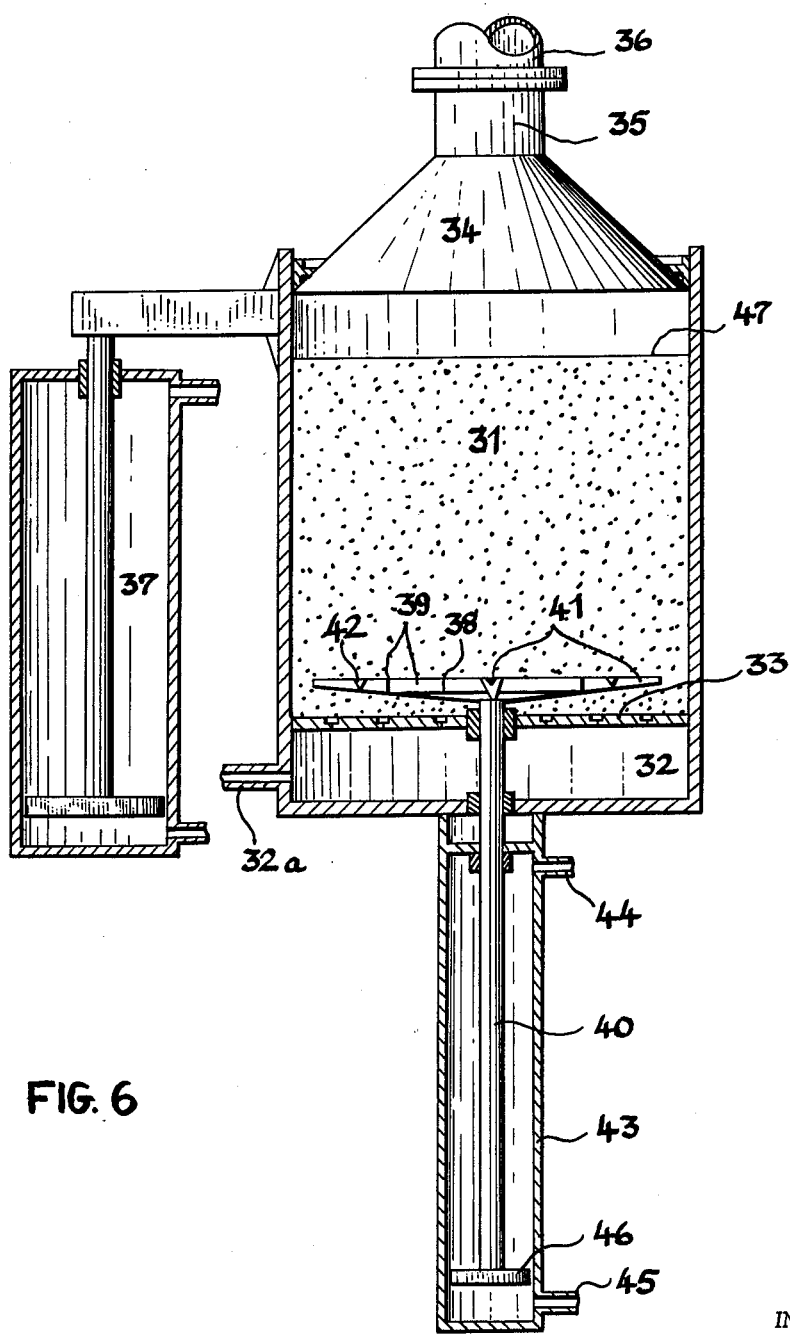
FIG. 6 represents a vertical section through one type of coating apparatus in accordance with the invention incorporating a support plate as illustrated in any one of FIGS. 1 to 5.

Referring now to FIG. 6, a preferred form of a coating apparatus incorporating the features of the present invention takes the form of a pipe coating apparatus and comprises an aerating vessel composed of an aerating space proper 31 and a gas box 32 with a gas inlet 32a. The gas box and the aerating space are separated by a gas-pervious bed support and gas distributing plate 33 of a type as described with reference to any one of FIGS. 1 to 5, forming the bottom of aerating space 31. An inverted funnel-shaped structure 34 is provided, movable in piston-like manner inside the aerating vessel. The stem 35 of the said funnel is flanged and a pipe 36 to be internally coated is mounted on top thereof. This pipe has been previously heated in any suitable manner to a suitable temperature above the fusing temperature of a thermoplastic coating powder in the aerating vessel 31.

The aerating vessel itself is supported by two or more hydraulically or pneumatically operated lifting devices 37 only one of which is shown, whereas the funnel-shaped structure 34, 35 is mounted stationary by means not shown.

Inside the aerating space 31 an agitating member 38 is provided, comprising a circular frame 39 connected to a lifting rod 40 by struts 41.

Interspaced between the said struts, a number of transverse members 42 are evenly distributed around the periphery of the ring-shaped frame 39, extending both outwardly and inwardly from the said frame without actually engaging either the lifting rod 40 or the walls of the aerating vessel. As can be seen from the drawing, all parts of the actual agitating member have a downward taper. The lifting rod 40 passes through the air distributing plate 33 and the bottom of the airbox into a pneumatic or hydraulic cylinder 43, provided with gas or fluid connections 44 and 45. The connecting rod 40 terminates in a piston 46.

The apparatus is operated as follows:

Air, under suitable pressure, is introduced through inlets 32a to the gas box 32. The air passes through the passages provided through the bed supporting plate 33.

The individual gas streams far out roughly in the form of cones above the plate and soon merge to effect a uniform aeration of the powder. The degree of aeration can be regulated in accordance with requirements by regulating the air pressure in the gas box 32. In the particular mode of operation now under discussion the powder is usually aerated sufficiently to result in a fluidized bed having an upper level 47.

Just prior to the actual coating operation, the agitating member 38 is rapidly moved upwards and then returned rather more slowly to the position shown in FIG. 6, whereafter the lifting devices 37 rapidly raise the whole aerating vessel, thereby reducing the volume of the aerating vessel below funnel-shaped structure 34 and causing the displacement of the particulate coating material upwards through funnel 34, 35 into the pipe 36 which is to be coated internally. The powder is maintained in pipe 36 normally for a period of the order of five seconds, during which time the pressure head of the powder mass is so high that the original fluidised bed condition immediately ceases to exist and is replaced by an intermediate condition of high aeration in which the powder particles do no longer carry out a whirling motion. After the contacting period the aerating vessel 31 is again lowered rapidly with respect to the funnel-shaped structure 34, 35 as a result of which the excess powder returns to the aerating vessel to be fluidised once again. The just described cycle of operations may then be repeated.

For ordinary dip coating, the apparatus may be substantially the same as in FIG. 6 except that the aerating vessel is stationary and the top 34, 35 is omitted. In this type of operation the gas pressure is preferably so adjusted that a static aerate is produced in the aerating vessel itself, i.e. a state of aeration intermediate between that of a fluidised bed and the loosely settled powder, in which state the powder is highly mobile but in which the individual powder particles are substantially stationary unless mechanically dispersed. The static aerate is preferably produced with powders composed of substantially spherical particles.

In the static aerate the gas streams through the bed support, after having emerged from the said individual passages through the bed support and having fanned out in a cone like manner, gradually merge and form a gentle generally upwards directed uniform gas stream, finally subdivided by the solid particles of the powder. Very even coatings are produced by dipping heated articles into such a static aerate of a thermoplastic powder.

What we claim is:

1. Apparatus for aerating particulate material comprising a container having side walls and a bottom wall, the bottom wall being a plate member having a top surface and a bottom surface, a plurality of apertures formed through the plate, each aperture comprising a straight-walled outlet passage through the top surface of the plate and a straight-walled inlet passage through the bottom surface of the plate, a constricted passage between the straight-walled passages and communicating therewith, a gas box encompassing the bottom of the plate in gas communicating relationship with the plate, and inlet means for introducing pressurized gas to the gas box and through said apertures.

2. Apparatus according to claim 1, comprising means for varying the volume of the container above the plate.

References Cited in the file of this patent

UNITED STATES PATENTS

| | | |
|---|---|---|
| 2,666,269 | Perry | Jan. 19, 1954 |
| 2,815,550 | Valyi | Dec. 10, 1957 |
| 2,844,489 | Gemmer | July 22, 1958 |
| 2,990,260 | Mungen | June 27, 1961 |

FOREIGN PATENTS

| | | |
|---|---|---|
| 838,738 | Great Britain | June 22, 1960 |

OTHER REFERENCES

Leva: Fluidization, McGraw-Hill Book Co., 1959.